(12) United States Patent
Matsen et al.

(10) Patent No.: US 9,674,899 B2
(45) Date of Patent: Jun. 6, 2017

(54) SHIM MANUFACTURING SYSTEM

(71) Applicant: The Boeing Company, Chicago, IL (US)

(72) Inventors: Marc Rollo Matsen, Seattle, WA (US); Brian W. Smith, Bellevue, WA (US); Robert James Miller, Fall City, WA (US)

(73) Assignee: THE BOEING COMPANY, Chicago, IL (US)

( * ) Notice: Subject to any disclaimer, the term of this patent is extended or adjusted under 35 U.S.C. 154(b) by 715 days.

(21) Appl. No.: 13/909,491

(22) Filed: Jun. 4, 2013

(65) Prior Publication Data

US 2014/0353305 A1  Dec. 4, 2014

(51) Int. Cl.

| | |
|---|---|
| *H05B 6/10* | (2006.01) |
| *B29C 35/08* | (2006.01) |
| *B64C 3/26* | (2006.01) |
| *B64F 5/00* | (2017.01) |
| *B29C 65/36* | (2006.01) |
| *B29C 65/48* | (2006.01) |
| *B29C 65/76* | (2006.01) |
| *B29C 65/78* | (2006.01) |
| *B29C 65/00* | (2006.01) |
| *B29L 31/30* | (2006.01) |

(Continued)

(52) U.S. Cl.
CPC ......... *H05B 6/108* (2013.01); *B29C 35/0805* (2013.01); *B64C 3/26* (2013.01); *B64F 5/0009* (2013.01); *B29C 37/0075* (2013.01); *B29C 65/362* (2013.01); *B29C 65/4835* (2013.01); *B29C 65/76* (2013.01); *B29C 65/7826* (2013.01); *B29C 66/112* (2013.01); *B29C 66/131* (2013.01); *B29C 66/301* (2013.01); *B29C 66/524* (2013.01); *B29C 66/543* (2013.01); *B29C 66/721* (2013.01); *B29C 66/7212* (2013.01); *B29C 2035/0811* (2013.01); *B29L 2011/0075* (2013.01); *B29L 2031/3085* (2013.01); *B64C 2001/0072* (2013.01); *Y02T 50/433* (2013.01)

(58) Field of Classification Search
CPC ......... B29C 66/7212; B29C 2035/0811; B29C 35/0805; B29C 37/0075; H05B 6/108
USPC .......... 156/73.1, 275.5, 379.6; 219/618, 632, 219/633, 634, 635, 602–617
See application file for complete search history.

(56) References Cited

U.S. PATENT DOCUMENTS

| | | | |
|---|---|---|---|
| 5,935,475 A | 8/1999 | Scoles et al. | |
| 6,333,494 B1 * | 12/2001 | Fischer | B23K 1/002 219/603 |

(Continued)

OTHER PUBLICATIONS

Extended European Search Report, dated Dec. 11, 2014, regarding Application No. EP14168314.4, 7 pages.

(Continued)

*Primary Examiner* — Quang D Thanh
*Assistant Examiner* — Joseph Iskra
(74) *Attorney, Agent, or Firm* — Yee & Associates, P.C.

(57) ABSTRACT

A method for forming a shim. A liquid shim material with a magnetically permeable material is applied in a location for the shim between a plurality of composite parts. A magnetic field is applied to the magnetically permeable material in the location. The magnetic field is configured to heat the liquid shim material to a temperature to cause the liquid shim material to become solid and form the shim.

17 Claims, 9 Drawing Sheets

(51) Int. Cl.
*B29L 11/00* (2006.01)
*B29C 37/00* (2006.01)
*B64C 1/00* (2006.01)

(56) References Cited

U.S. PATENT DOCUMENTS

| | | | |
|---|---|---|---|
| 6,566,635 | B1 | 5/2003 | Matsen et al. |
| 8,330,086 | B2 | 12/2012 | Miller et al. |
| 2007/0011970 | A1* | 1/2007 | Hethcock et al. ........... 52/481.1 |
| 2010/0133261 | A1* | 6/2010 | Schildt .......................... 219/635 |
| 2011/0028061 | A1 | 2/2011 | Sanderson et al. |
| 2012/0211144 | A1 | 8/2012 | Litzenberger et al. |

OTHER PUBLICATIONS

Canadian Intellectual Property Office Examination Search Report, dated Jul. 8, 2015, regarding Application No. 2,847,856, 4 pages.
Canadian Intellectual Property Office Examination Search Report, dated Mar. 17, 2015, regarding Application No. 2,847,856, 4 pages.
Chinese Notification of First Office Action and English translation, dated Feb. 27, 2017, regarding Application No. 201410244743.3, 17 pages.

* cited by examiner

SHIM MANUFACTURING SYSTEM

BACKGROUND INFORMATION

1. Field

The present disclosure relates generally to manufacturing and, in particular, to manufacturing composite structures. Still more particularly, the present disclosure relates to methods and apparatuses for assembling a composite structure with a liquid shim.

2. Background

In manufacturing a composite structure, different parts are connected to each other to form the composite structure. For example, composite materials may be laid up in the shape of a composite part. The dimensions of these parts are carefully designed and the layout of composite materials is configured to result in desired dimensions when the composite parts are cured or consolidated.

In some cases, a desired level of thickness may not always be obtained. For example, when a composite part is formed, the actual dimensions of the composite part may not be as close as desired to the specified dimensions. As a result, when the composite part is assembled with other composite parts, a gap may be present.

One solution is to discard the composite part and manufacture a new composite part as a replacement. This solution may provide a composite part with the desired dimensions that reduces or eliminates the gap when the composite part is assembled with other composite parts.

This solution, however, may take more time than desired when composite parts are discarded and remanufactured. Additionally, this type of solution also may increase the expense of manufacturing the composite structure to a level that is higher than desired.

Another solution involves creating a composite part to fill the gap. This composite part may fill the gap for aesthetic purposes and also may provide structural features within the composite structure.

One type of shim that may be used is a liquid shim. With a liquid shim, a fluid material is placed into the gap. This fluid material may then be cured. This curing often occurs at room temperature. The time needed for curing at room temperature, however, may be longer than desired. For example, curing may take 2 to 3 hours. Waiting this amount of time between different operations in forming a composite structure and using that composite structure to form assemblies or some other object may be greater than desired.

The speed at which a liquid shim cures may be increased with the application of heat. However, if the heat applied is not at the correct temperature or does not have the desired temperature at different locations, the liquid shim may not perform as desired after curing. As a result, additional time and expense may occur if heating is not applied in a desired manner.

Therefore, it would be desirable to have a method and apparatus that take into account at least some of the issues discussed above, as well as other possible issues.

SUMMARY

An embodiment of the present disclosure provides a method for forming a shim. A liquid shim material with a magnetically permeable material is applied in a location for the shim between a plurality of composite parts. A magnetic field is applied to the magnetically permeable material in the location. The magnetic field is configured to heat the liquid shim material to a temperature to cause the liquid shim material to become solid and form the shim.

Another embodiment of the present disclosure provides another method for forming a shim. A liquid shim material with a magnetically permeable material is applied in a location for the shim between a plurality of parts. A magnetic field is applied to the magnetically permeable material in the location. The magnetic field is configured to heat the liquid shim material to a temperature to cause the liquid shim material to become solid and form the shim.

Yet another embodiment of the present disclosure provides an apparatus comprising a liquid shim material with a magnetically permeable material applied in a location for a shim between a plurality of composite parts and a magnetic field generator. The magnetic field generator is configured to apply a magnetic field to the magnetically permeable material in the location. The magnetic field is configured to heat the liquid shim material to a temperature to cause the liquid shim material to become solid and form the shim.

In still another illustrative embodiment, an aircraft comprises a first part, a second part, and a shim. The second part includes a portion configured to be adjacent to the first part upon attachment thereto, wherein the second part is at least partially separated from the first part by a gap due to variances in fabrication. The shim is disposed in the gap between the first part and the second part, wherein the shim comprises a magnetically permeable material disposed therein, and the shim is solidified in place in the gap between the first part and the second part from exposing the magnetically permeable material to a magnetic field.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that placing one or more heating elements in one or more locations relative to the liquid shim material may allow for desired heating of the liquid shim material. For example, the liquid shim material may be heated more evenly to the same temperature when the one or more heating elements are placed in one or more desired locations.

Thus, the illustrative embodiments provide a method and apparatus for forming a shim. A liquid shim material with a magnetically permeable material is applied in a location for a shim between a plurality of composite parts. A magnetic field is applied to the magnetically permeable material in a location configured to heat the liquid shim material to a temperature to cause the liquid shim material to become solid and form the shim. In this manner, a shim may be formed to provide a desired fit between the plurality of composite parts.

Figure 1:
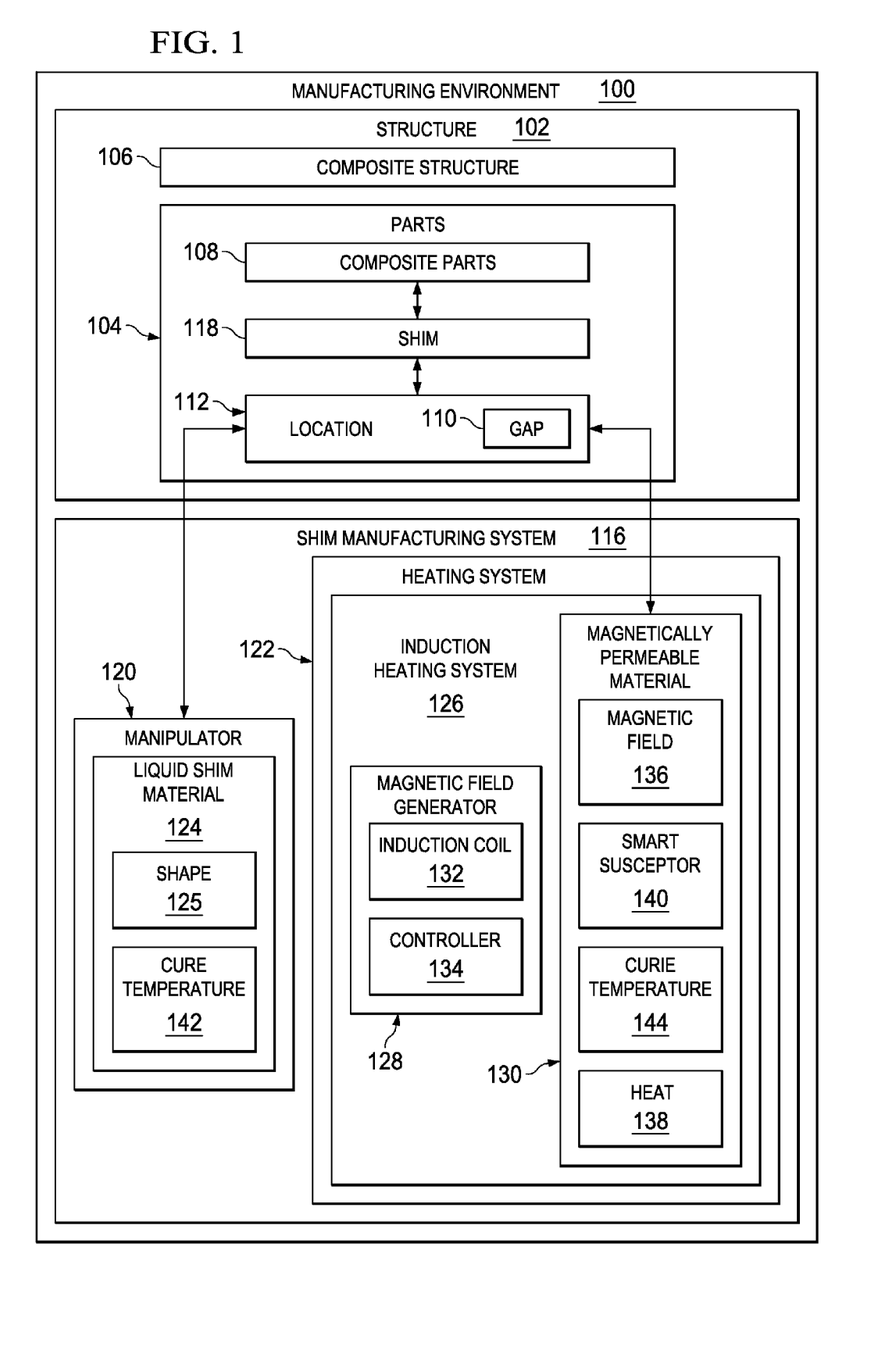
FIG. 1 is an illustration of a manufacturing environment in the form of a block diagram in accordance with an illustrative embodiment.

With reference now to the figures, and in particular, with reference to FIG. 1, an illustration of a manufacturing environment is depicted in the form of a block diagram in accordance with an illustrative embodiment. As depicted, manufacturing environment 100 may be used to manufacture structure 102 from a plurality of parts 104. In this illustrative example, structure 102 may take the form of composite structure 106 and the plurality of parts 104 is a plurality of composite parts 108. In these illustrative examples, composite parts 108 may be comprised of fiber reinforced materials, such as a fiber reinforced polymer, and in particular, a carbon fiber reinforced plastic (CFRP).

In this illustrative example, gap 110 may be present in location 112 between the plurality of composite parts 108. As depicted, gap 110 may have a size that is undesirable. Gap 110 may result in the plurality of composite parts 108 not having a desired level of performance when assembled to form composite structure 106.

In this illustrative example, the desired level of performance for the plurality of composite parts 108 may take various forms. For example, the desired level of performance may be at least one of loading, preciseness of aerodynamic configurations, airflow over surfaces, and other suitable types of performance.

In this illustrative example, shim manufacturing system 116 may be used to form shim 118 in location 112 between the plurality of composite parts 108. In particular, shim 118 may be formed to fill gap 110 in location 112 between the plurality of composite parts 108.

As depicted, shim manufacturing system 116 includes manipulator 120 and heating system 122. As depicted, manipulator 120 is a hardware component configured to apply liquid shim material 124 to location 112 for shim 118 between the plurality of composite parts 108. In these illustrative examples, liquid shim material 124 may have shape 125 when applied to location 112. In other words, liquid shim material 124 may be pre-formed into shape 125 for shim 118 before being applied to location 112.

Further, application of liquid shim material 124 may include magnetically permeable material 130 within liquid shim material 124 in some illustrative examples. The shape may be maintained using structures such as a release film, plastic strips, and other suitable structures that may aid in forming shape 125 for liquid shim material 124.

In the illustrative examples, manipulator 120 may take various forms. For example, manipulator 120 may include at least one of a human operator, a robotic arm, a crawler, or some other suitable type of device.

Liquid shim material 124 may be any material that may be heated to form a solid for shim 118. Liquid shim material 124 may be, for example, an epoxy in a liquid that may be shaped. This liquid may have different viscosities depending on the particular implementation. For example, the liquid may have a viscosity similar to a paste. In these illustrative examples, liquid shim material 124 may be selected as a material that may cure in about six hours to about 24 hours in an ambient temperature. Liquid shim material 124 may cure in less time when heated from about 150 degrees F. to about 220 degrees F. depending on the particular material used.

In this illustrative example, heating system 122 takes the form of induction heating system 126. Heating system 122 includes magnetic field generator 128 and magnetically permeable material 130.

Magnetic field generator 128 may comprise induction coil 132 and controller 134. Induction coil 132 is a hardware device configured to generate magnetic field 136 under the control of controller 134. Controller 134 is a hardware device and controls the application of current to induction coil 132 to control the generation of magnetic field 136.

In this illustrative example, magnetic field 136 interacts with magnetically permeable material 130 to cause magnetically permeable material 130 to generate heat 138. In particular, magnetic field 136 may be an electromagnetic flux field that interacts with magnetically permeable material 130.

In some illustrative examples, magnetically permeable material 130 may be in the form of a wire having a diameter of about 0.003 inches to about 0.020 inches. Of course, the diameter may vary for different applications. Magnetically permeable material 130 may generate heat when magnetic field 136 fluctuates at a frequency from about 20 kHz to about 500 kHz. The fluctuation of magnetic field 136 may result in heat from electric resistance caused by the flow of current induced within magnetically permeable material 130. The temperatures in which heating does not pass may be from about 140 degrees F. to about 420 degrees F., depending on the particular material selected in these illustrative examples. For example, the heating may decrease to about zero such that the temperature remains at substantially the same temperature at that time. Of course, other diameters and other temperatures may be used depending on the particular implementation.

In this illustrative example, magnetically permeable material 130 is located within liquid shim material 124. Magnetically permeable material 130 may be placed in at least one of liquid shim material 124 in location 112 prior to liquid shim material 124 being applied to location 112, on liquid shim material 124 after liquid shim material 124 is applied to location 112, or in some other manner.

As used herein, the phrase "at least one of," when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In other words, the application of liquid shim material 124 may be performed in various ways. Liquid shim material 124 may be placed into location 112 with shape 125. In other illustrative examples, liquid shim material 124 may be poured or squeezed out of a container into location 112 and shaped using a mold or other structures.

In this illustrative example, liquid shim material 124 may be selected to allow for shaping of liquid shim material 124. In other words, the viscosity of liquid shim material 124 may be such that liquid shim material 124 may flow at a rate that allows for application and heating within gap 110 in a desired manner. In other words, liquid shim material 124 may flow slowly enough such that liquid shim material 124 may maintain a substantially desired shape while being heated to form shim 118.

Magnetically permeable material 130 may be comprised of various types of materials. For example, magnetically permeable material 130 may be selected from at least one of an alloy, a cobalt, an iron alloy, a nickel and iron alloy, an iron and silicon alloy, an amorphous magnetic alloy, a crystalline magnetic alloy, or some other suitable material. Further, in this illustrative example, magnetically permeable material 130 may take the form of smart susceptor 140.

As depicted, smart susceptor 140 may be a magnetically permeable material that has a Curie temperature that is selected for a particular application. The Curie temperature may be selected such that heat generated by the magnetically permeable material in response to an alternating magnetic field decreases sufficiently such that the temperature reaches equilibrium. The heat generated may be about zero. For example, the selection may be such that the temperature is maintained substantially at a cure temperature for liquid shim material 124.

Further, magnetically permeable material 130 may have various forms of shapes. For example, magnetically permeable material 130 may have a shape selected from at least one of a wire, a strip, a plate, a sheet, or some other suitable shape. The particular shape selected may vary depending on the particular implementation. For example, a plate may be used for applications in which the avoidance of extraneous heating may be desired. Wires may be used when contours in the shape may be present with some massive complexity. Further, these different components may be segmented rather than one component. Further, different shapes may be used at the same time.

In these illustrative examples, magnetically permeable material 130 may be configured to generate heat 138 to at least cure temperature 142. Cure temperature 142 is the temperature at which liquid shim material 124 changes into a solid to form shim 118. In particular, magnetically permeable material 130 has Curie temperature 144. Curie temperature 144 for magnetically permeable material 130 is selected to be at least cure temperature 142 for liquid shim material 124 in this illustrative example.

As depicted, Curie temperature 144 is the temperature at which magnetic properties of magnetically permeable material 130 reduce. In particular, the magnetic properties may substantially disappear at Curie temperature 144. As a result, magnetically permeable material 130 may not increase in temperature much beyond Curie temperature 144. In these illustrative examples, magnetically permeable material 130 heats up to reach Curie temperature 144 at a desired rate.

With the selection of Curie temperature 144 based on cure temperature 142, magnetically permeable material 130 may be substantially self-controlling. In other words, the temperature that magnetically permeable material 130 reaches may be self-limiting with the selection of Curie temperature 144. In this manner, controller 134 may be simpler in design and implementation.

Thus, shim manufacturing system 116 may form shim 118 in gap 110 with a desired level of performance. In these illustrative examples, heating system 122 in the form of induction heating system 126 may generate heat 138 at the desired temperature within location 112. In other words, cure temperature 142 may have a desired profile throughout liquid shim material 124. The profile may be temperatures for portions of liquid shim material 124. In these illustrative examples, cure temperature 142 may be the same throughout all of liquid shim material 124 as applied to location 112 in which gap 110 is present.

With the use of magnetically permeable material 130, the heating of liquid shim material 124 may be performed more quickly than with currently used systems such as heat blankets, heat lamps, or other devices. Further, the heating of liquid shim material 124 may be made more evenly with respect to temperatures for curing liquid shim material 124. In the illustrative example, the shim is heated through the use of magnetically permeable material 130 while other structures in the area may be cooler as compared to currently used heating systems.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although heating system 122 has been illustrated to include magnetic field generator 128 having controller 134 and induction coil 132, magnetic field generator 128 may include other components in addition to or in place of the ones depicted. For example, magnetic field generator 128 also may include a power source.

In another illustrative example, magnetically permeable material 130 may have one or more Curie temperatures in addition to Curie temperature 144. As a result, magnetically permeable material 130 may be controlled to reach various temperatures depending on the particular implementation.

Figure 2:
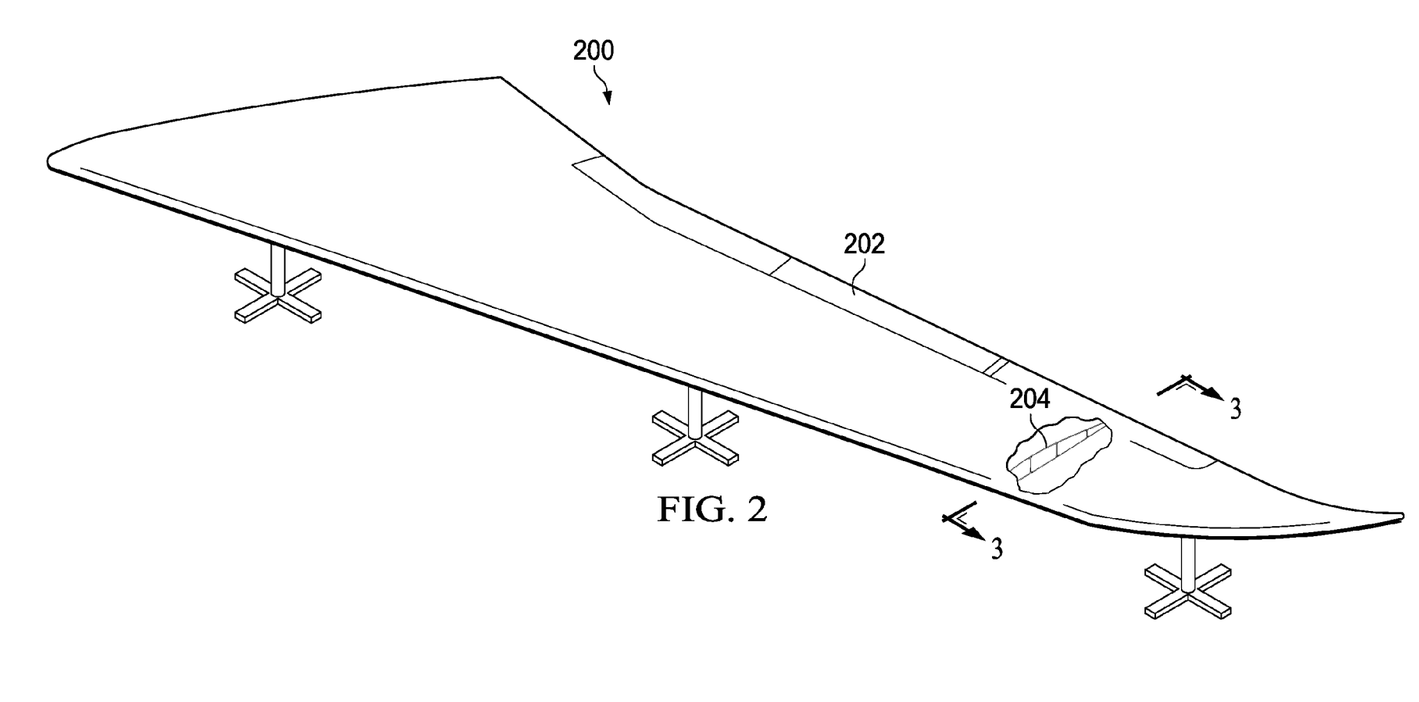
FIG. 2 is an illustration of a composite wing in accordance with an illustrative embodiment.

With reference now to FIG. 2, an illustration of a composite wing is depicted in accordance with an illustrative embodiment. In this illustrative example, composite wing 200 is an example of composite structure 106 shown in block form in FIG. 1.

As depicted, composite wing 200 is shown in a partially completed state. As depicted, composite wing 200 includes skin panels 202 and support structure 204. Support structure 204 may include ribs and spars as well as other parts. As depicted, these different parts in composite wing 200 are composite parts.

In this illustrative example, a gap may be present between one or more skin panels 202 and support structure 204 when manufacturing composite wing 200. The gap may be filled using a shim that is formed in accordance with an illustrative embodiment.

Figure 3:
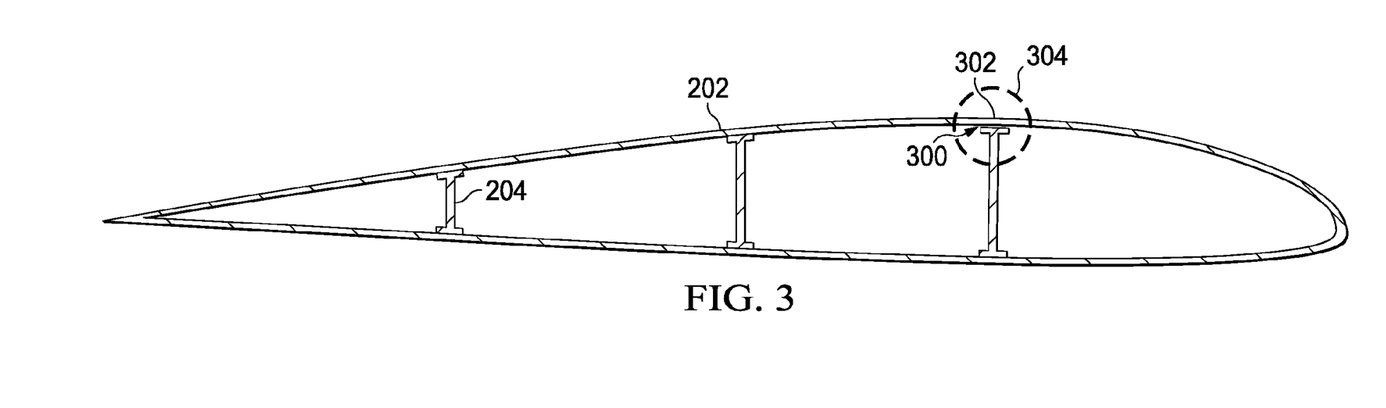
FIG. 3 is an illustration of a cross-section of a composite wing in accordance with an illustrative embodiment.

With reference next to FIG. 3, an illustration of a cross-section of a composite wing is depicted in accordance with an illustrative embodiment. In this illustrative example, a cross-sectional view of composite wing 200 is shown taken along lines 3-3 in FIG. 2.

In this view, gap 300 is present between skin panel 302 in skin panels 202 and support structure 204. A more detailed view of section 304 is shown in FIG. 4 below.

Figure 4:
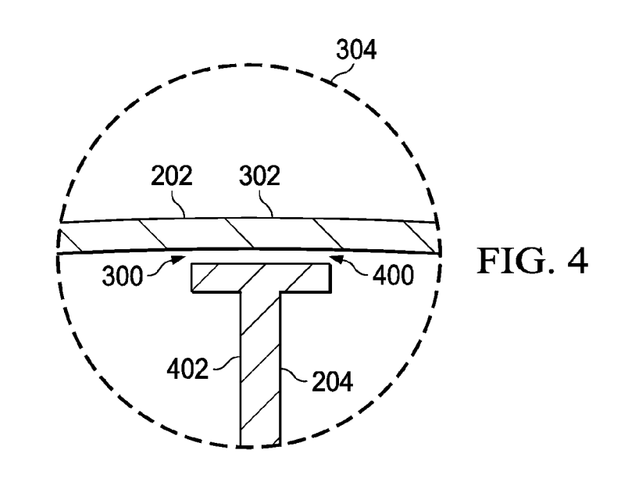
FIG. 4 is a more detailed illustration of a portion of a composite wing in accordance with an illustrative embodiment.

In FIG. 4, a more detailed illustration of a portion of a composite wing is depicted in accordance with an illustrative embodiment. A more detailed view of section 304 is shown in this figure.

As depicted, gap 300 is in location 400 between skin panel 302 and rib 402 in support structure 204. Gap 300 may be reworked to minimize or eliminate gap 300 in accordance with an illustrative embodiment. In this manner, a better fit may be provided between skin panel 302 and rib 402.

Figure 5:
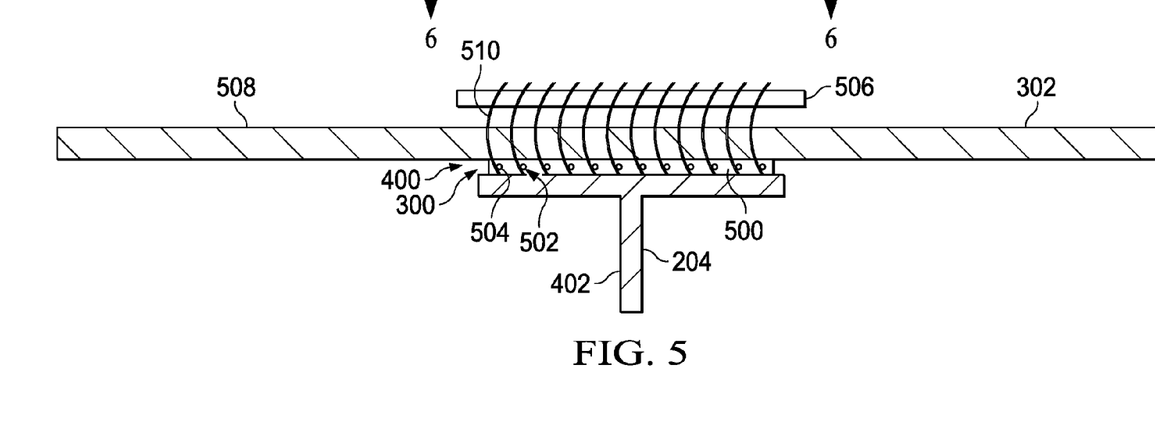
FIG. 5 is an illustration of a liquid shim material in a gap in accordance with an illustrative embodiment.

Turning next to FIG. 5, an illustration of a liquid shim material in a gap is depicted in accordance with an illustrative embodiment. In this depicted example, liquid shim material 500 is shown placed within gap 300 and location 400 between a plurality of composite parts. In this example, the plurality of composite parts comprises skin panel 302 and rib 402.

In addition, magnetically permeable material 502 in the form of wires 504 is located within liquid shim material 500. In this illustrative example, wires 504 may be smart susceptors. As can be seen in this illustrative example, induction coil 506 is positioned over liquid shim material 500 in location 400 within gap 300. In this example, induction coil 506 is positioned substantially parallel to surface 508 of skin panel 302.

Induction coil 506 is configured to generate magnetic field 510. As can be seen in this particular example, magnetic field 510 extends through skin panel 302 and encompasses liquid shim material 500. Wires 504 extend substantially parallel to magnetic field 510 in this illustrative example.

Magnetically permeable material 502 in wires 504 may be comprised of various materials. In this illustrative example, magnetically permeable material 502 may be, for example, a ferromagnetic material with a level of nickel that provides a desired level of corrosion resistance. Further, wires 504 may have various diameters. In this illustrative example, a wire in wires 504 may have a diameter from about 0.003 inches to about 0.020 inches. Of course, other diameters may be used too.

Also, in this illustrative example, wires 504 have a circular cross-section. In other illustrative examples, wires 504 may have other cross-section shapes such as a triangle, a trapezoid, an oval, or some other suitable shape. The selection of the cross-section may depend on whether wires 504 are to remain within liquid shim material 500 after liquid shim material 500 has been cured. The curing causes liquid shim material 500 to take a solid form.

Magnetic field 510 generated by induction coil 506 causes wires 504 to generate heat. This heat may then heat liquid shim material 500 to cure liquid shim material 500 into a solid form. In particular, this heat is configured to cause liquid shim material 500 to form a solid. The heating may be caused by fluctuations in magnetic field 510.

As depicted, induction coil 506 may operate with frequency from about 20 kHz to about 500 kHz. In these illustrative examples, the frequency may control the current depth in wires 504. As the temperature increases, at some point wires 504 change from a magnetic condition to a nonmagnetic condition. As a result, the power generated in wires 504 drops and wires 504 do not increase in temperature from heating.

In particular, the heat generated by magnetically permeable material 502 in wires 504 may reach a temperature that is at least the curing temperature for liquid shim material 500 to form a shim when liquid shim material 500 cures into a solid form. This temperature may be selected through controlling magnetic field 510, the selection of the Curie temperature for magnetically permeable material 502 in wires 504, or some combination thereof. In these illustrative examples, the temperature at which wires 504 do not increase in temperature also may be a function of the diameter of wires 504. Increasing the diameter of wires 504 increases the temperature at which wires 504 stop heating.

With the selection of magnetically permeable material 502 having a Curie temperature that is substantially close to the curing temperature of liquid shim material 500, the curing of liquid shim material 500 may be performed more easily in this illustrative example. The curing of liquid shim material 500 also may be performed more reliably. For example, with the use of magnetically permeable material 502, a more uniform heating may occur as compared to other heating systems. With other heating systems such as heating blankets, some portions of liquid shim material 500 may heat to different temperatures. For example, a portion of liquid shim material 500 that may be near a heat sink may be lower than desired as compared to other portions of liquid shim material 500 when a heat blanket is used.

The selection of the Curie temperature for magnetically permeable material 502 may provide for a self-controlling of a mechanism for the temperature reached by heat generated by magnetically permeable material 502. Once a Curie temperature is identified, magnetically permeable material 502 is selected based on the temperature.

In other words, the magnetic field generator may not need to be controlled to control the temperature generated by wires 504. The magnetic field generator may only need to be controlled to cause wires 504 to generate heat to the maximum temperature without requiring a regulator or feedback system. The Curie temperature is selected to be greater than the curing temperature in these illustrative examples. This type of selection of the Curie temperature may be performed such that wires 504 generate a desired amount of heat. The desired amount of heat may be at a level that compensates for heat that may be conducted from liquid shim material 500 into other structures such as support structure 204, skin panel 302, or both.

For example, the Curie temperature may be selected to be about 50 degrees F. to about 75 degrees F. above the temperature at which curing is desired. Of course, the particular temperature selected may vary depending on the material. In the illustrative example, this temperature may be dependent on the type of alloy that is selected for use in wires 504.

Figure 6:
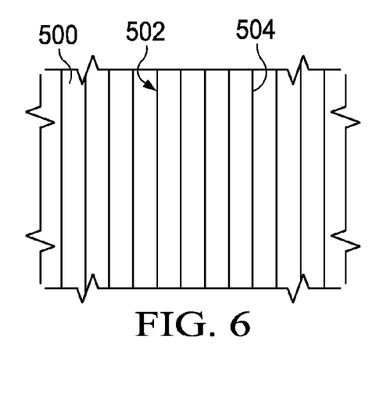
FIG. 6 is an illustration of an exposed view of a liquid shim material with a magnetically permeable material in accordance with an illustrative embodiment.

Turning next to FIG. 6, an illustration of an exposed view of a liquid shim material with a magnetically permeable material is depicted in accordance with an illustrative embodiment. In this example, an exposed view in the direction of lines 6-6 in FIG. 5 is shown. In this exposed view, skin panel 302 and induction coil 506 are not shown.

In this view, magnetically permeable material 502 in wires 504 are illustrated as running substantially parallel to each other. Wires 504 are located within liquid shim material 500 in this particular example.

Figure 7:
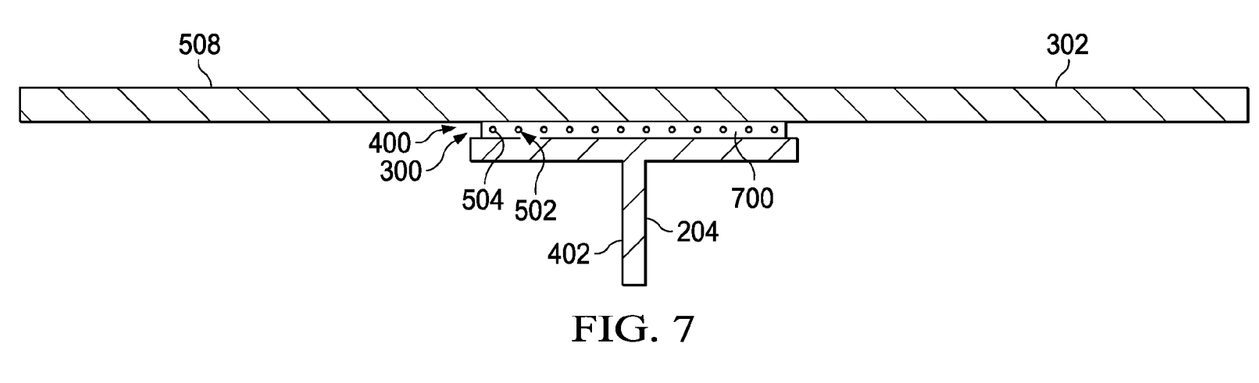
FIG. 7 is an illustration of a shim formed from a liquid shim material in accordance with an illustrative embodiment.

With reference next to FIG. 7, an illustration of a shim formed from a liquid shim material is depicted in accordance with an illustrative embodiment. In this illustrative example, shim 700 results from the curing of liquid shim material 500 in FIG. 5. In this particular example, magnetically permeable material 502 remains within shim 700.

Figure 8:
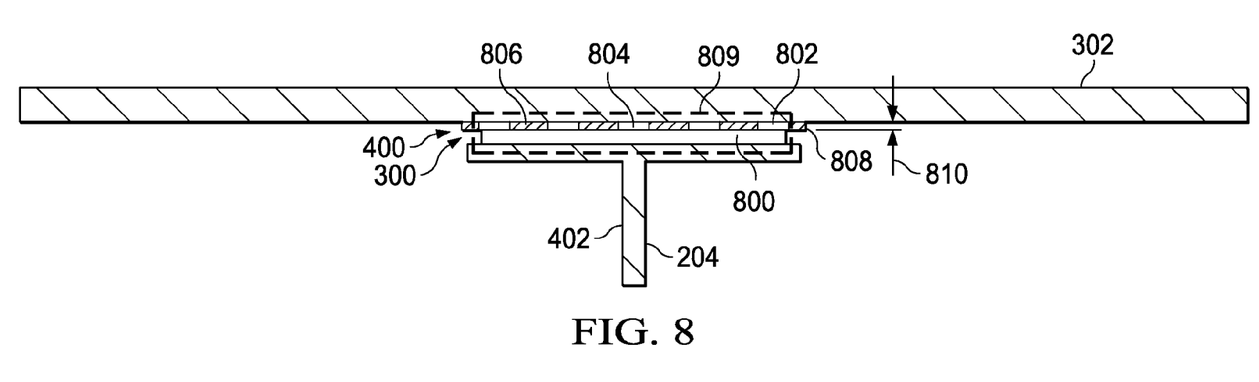
FIG. 8 is an illustration of a liquid shim material in a gap in accordance with an illustrative embodiment.

Turning now to FIG. 8, an illustration of a liquid shim material in a gap is depicted in accordance with an illustrative embodiment. As depicted, liquid shim material 800 is placed into gap 300 in location 400.

In this illustrative example, induction coil 802 and magnetically permeable material 804 in the form of wires 806 are located in layer 808. As depicted, layer 808 is placed in contact with liquid shim material 800.

In this illustrative example, induction coil 802 in layer 808 is configured to generate magnetic field 809. In response to magnetic field 809, wires 806 in layer 808 generate heat for curing liquid shim material 800.

In this illustrative example, wires 806 have a cross-section with a rectangular shape. In this particular example, thickness 810 of layer 808 may be negligible with respect to the formation of a shim in gap 300. Further, skin panel 302 may be removed during the curing of liquid shim material 800 such that liquid shim material 800 has thickness 810 to fill gap 300 between skin panel 302 and rib 402.

In other illustrative examples, induction coil 802 may be located outside of layer 808 while magnetically permeable material 804 in the form of wires 806 may remain in layer 808. The location of induction coil 802 may be on top of skin panel 302 or at any location in which magnetic field 809 may be generated by induction coil 802 such that wires 806 in layer 808 generate heat for curing liquid shim material 800.

Figure 9:
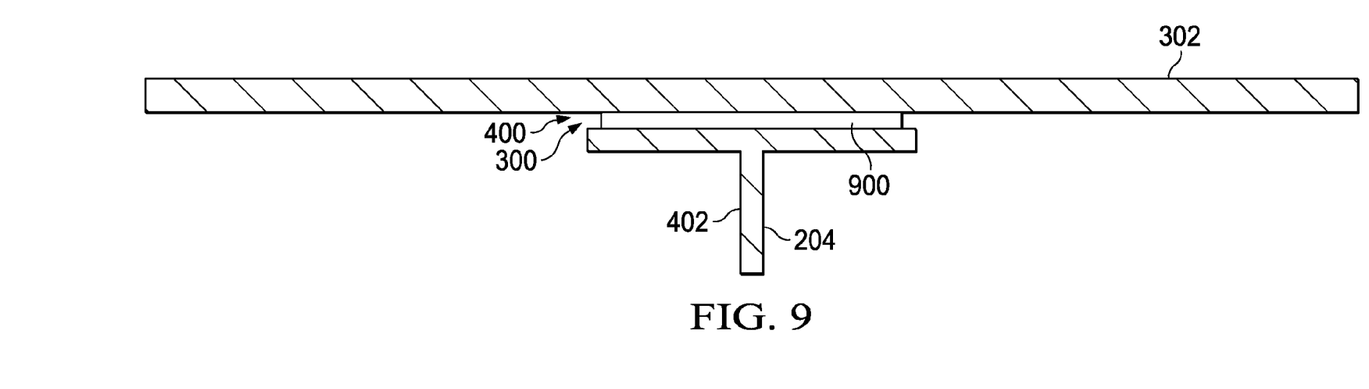
FIG. 9 is an illustration of a shim formed from a liquid shim material in accordance with an illustrative embodiment.

With reference now to FIG. 9, an illustration of a shim formed from a liquid shim material is depicted in accordance with an illustrative embodiment. In this illustrative example, layer 808 has been removed after curing of liquid shim material 800 to form shim 900. Parts such as skin panel 302 may be connected to composite wing 200 from FIG. 2 to finish manufacturing of composite wing 200. As can be seen, layer 808 is absent from composite wing 200 in this particular example.

The illustration of the formation of a shim using a liquid shim material in FIGS. 2-9 are not meant to imply limitations to the manner in which other illustrative embodiments may be implemented. For example, although a shim has been shown as being formed between a skin panel and a rib, a shim may be formed in accordance with an illustrative embodiment between other parts. For example, a shim may be formed in the gap between a skin panel and a spar. A shim also may be formed between other components such as a wing to body joint area, a horizontal stabilizer to body joint, a vertical stabilizer to body joint, a floor beam to fuselage joint, and other suitable components.

Also, the different components shown in FIGS. 2-9 may be combined with components in FIG. 1, used with components in FIG. 1, or a combination of the two. Additionally, some of the components in FIGS. 2-9 may be illustrative examples of how components shown in block form in FIG. 1 can be implemented as physical structures.

Figure 10:
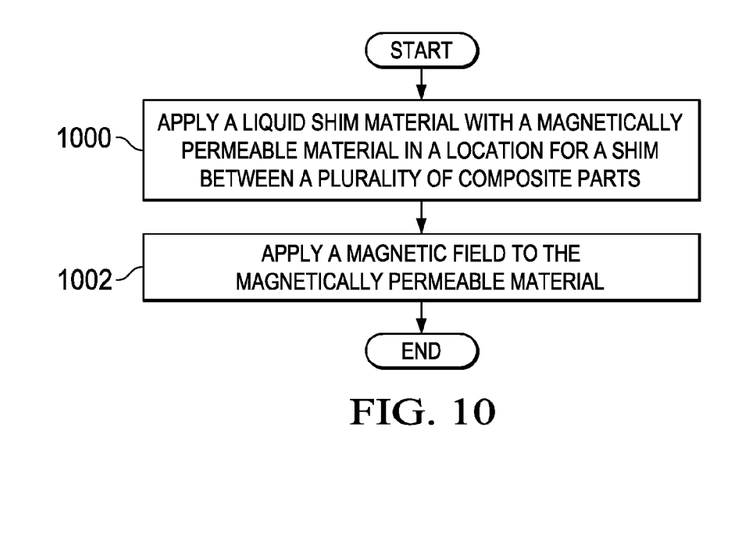
FIG. 10 is an illustration of a flowchart of a process for forming a shim in accordance with an illustrative embodiment.

With reference now to FIG. 10, an illustration of a flowchart of a process for forming a shim is depicted in accordance with an illustrative embodiment. The process illustrated in FIG. 10 may be implemented in manufacturing environment 100 using shim manufacturing system 116 in FIG. 1.

The process begins by applying a liquid shim material with a magnetically permeable material in a location for a shim between a plurality of composite parts (operation 1000). In operation 1000, the magnetically permeable material is placed in at least one of in the liquid shim material in the location prior to the liquid shim material being applied to the location, or on the liquid shim material after the liquid shim material is applied to the location. Further, the liquid shim material may have a shape desired for the shim when applied to the location.

In other illustrative examples, the liquid shim material may be applied to the location in a manner that forms the shape desired for the shim. For example, a release film, plastic strips, or other structures may be used to form a mold for the shim.

The process then applies a magnetic field to the magnetically permeable material (operation 1002), with the process terminating thereafter. In operation 1002, the magnetic field is configured to heat the liquid shim material to a temperature to cause the liquid shim material to become solid and form the shim.

Figure 11:
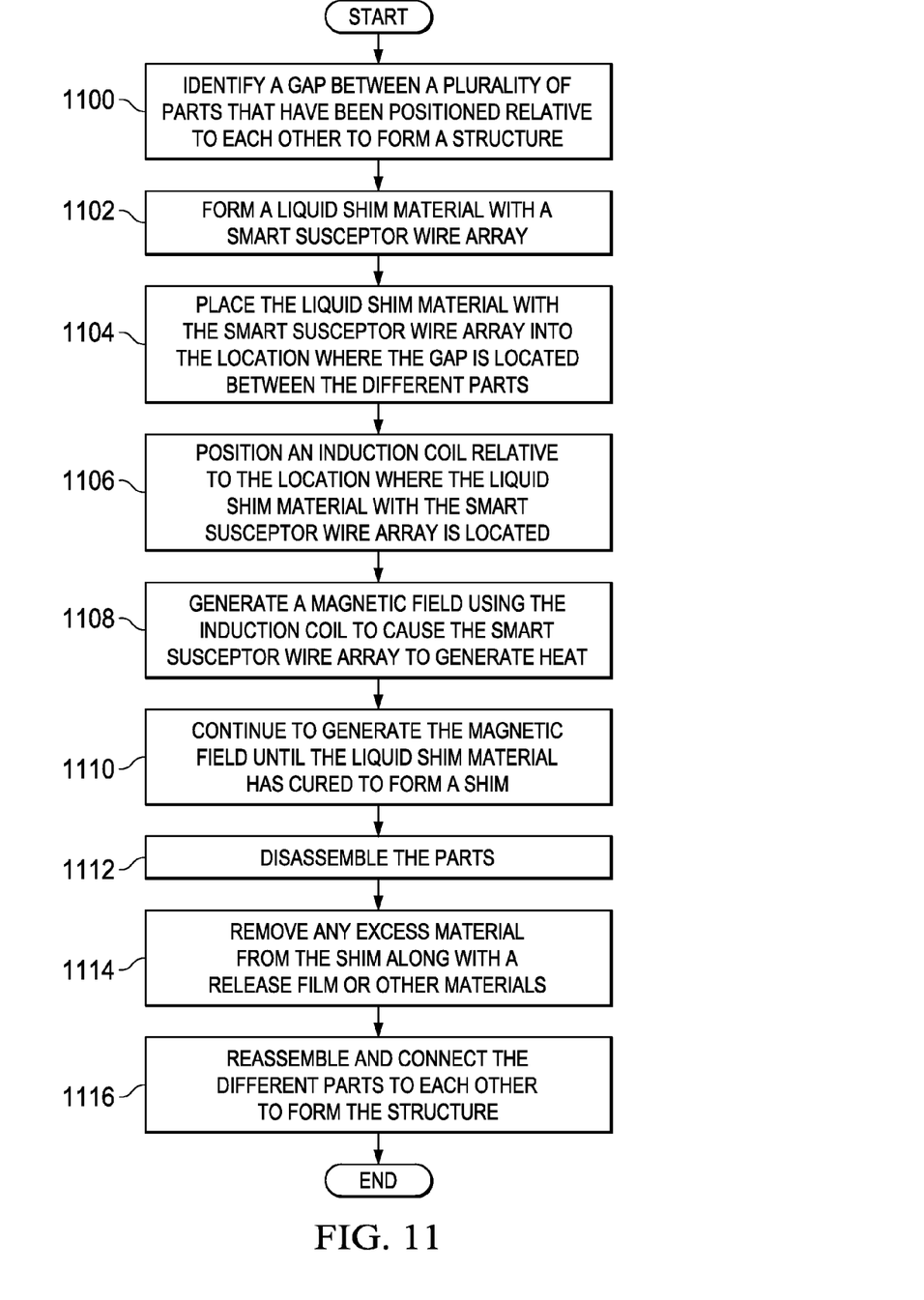
FIG. 11 is an illustration of a flowchart of a process for forming a shim using smart susceptors in accordance with an illustrative embodiment.

Turning now to FIG. 11, an illustration of a flowchart of a process for forming a shim using smart susceptors is depicted in accordance with an illustrative embodiment. The process illustrated in FIG. 10 may be implemented in manufacturing environment 100 using shim manufacturing system 116 in FIG. 1.

The process begins by identifying a gap between a plurality of parts that have been positioned relative to each other to form a structure (operation 1100). The process then forms a liquid shim material with a smart susceptor wire array (operation 1102). In this illustrative example, materials may be used to form the liquid shim material. These materials may take various forms. For example, two materials may be mixed such that they begin to cure after mixing. As another illustrative example, the liquid shim material may be a temperature in which curing did not occur. When the material reaches room temperature, curing of the liquid shim material may occur. The liquid shim material may have various viscosities. For example, the liquid shim material may have a viscosity similar to clay or a paste. The smart susceptor wire array is an array of wires including a magnetically permeable material.

The liquid shim material with the smart susceptor wire array is placed into the location where the gap is located between the different parts (operation 1104). Of course, other materials such as release films, plastic layers, or other structures may be used to provide a mold for the liquid shim material with the smart susceptor wire array.

An induction coil is positioned relative to the location where the liquid shim material with the smart susceptor wire array is located (operation 1106). The process generates a magnetic field using the induction coil to cause the smart susceptor wire array to generate heat (operation 1108). The process continues to generate the magnetic field until the liquid shim material has cured to form a shim (operation 1110).

The process then disassembles the parts (operation 1112). The process removes any excess material from the shim along with a release film or other materials (operation 1114).

The different parts are then reassembled and connected to each other to form the structure (1116), with the process terminating thereafter.

Figure 12:
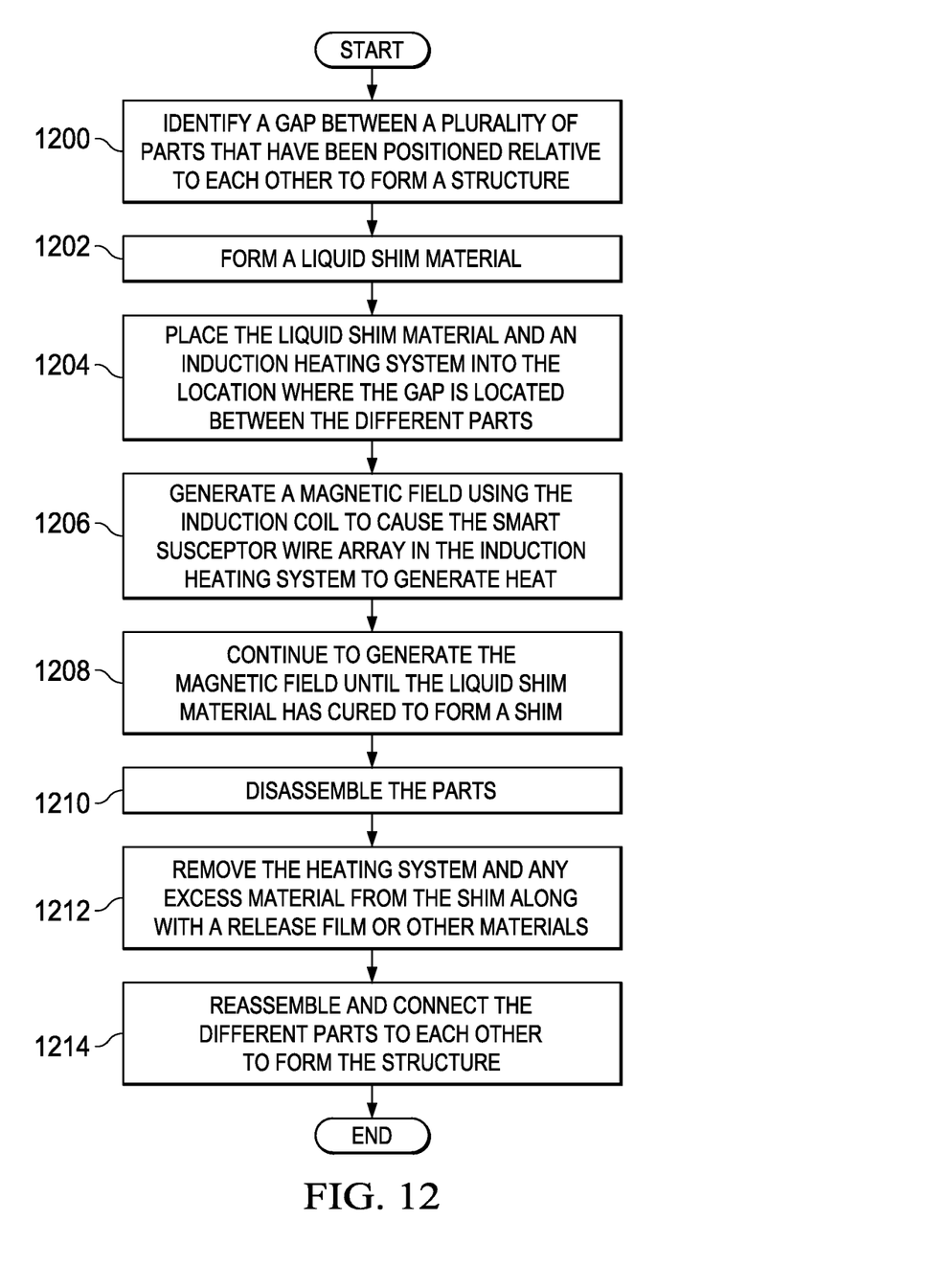
FIG. 12 is another illustration of a flowchart of a process for forming a shim using smart susceptors in accordance with an illustrative embodiment.

With reference next to FIG. 12, another illustration of a flowchart of a process for forming a shim using smart susceptors is depicted in accordance with an illustrative embodiment. The process illustrated in FIG. 12 may be implemented in manufacturing environment 100 using shim manufacturing system 116 in FIG. 1.

The process begins by identifying a gap between a plurality of parts that have been positioned relative to each other to form a structure (operation 1200). The process then forms a liquid shim material (operation 1202).

The liquid shim material and an induction heating system are placed into the location where the gap is located between the different parts (operation 1204). Of course, other materials such as release films, plastic layers, and other structures may be used to provide a mold for the liquid shim material with the acceptor wire array. In this illustrative example, the induction heating system is a layer including a smart susceptor wire array and an induction coil. This layer may be placed on top of the liquid shim material in this illustrative example.

The process generates a magnetic field using the induction coil to cause the smart susceptor wire array in the induction heating system to generate heat (operation 1206). The process continues to generate the magnetic field until the liquid shim material has cured to form a shim (operation 1208).

The process then disassembles the parts (operation 1210). The process removes the heating system and any excess material from the shim along with a release film or other materials (operation 1212). The different parts are then reassembled and connected to each other to form the structure (1214), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, although the different operations illustrated in FIG. 9 have been described with respect to composite parts, the different illustrative examples may be applied to other types of parts other than composite parts. Further, the parts in a structure may be mixed between composite and non-composite parts in accordance with an illustrative embodiment.

As another example, the heating system may only include a layer in which the smart susceptor wire array is present. The induction coil is positioned over the part. In this example, the layer is still removed after the shim has been formed from the liquid shim material.

Figure 13:
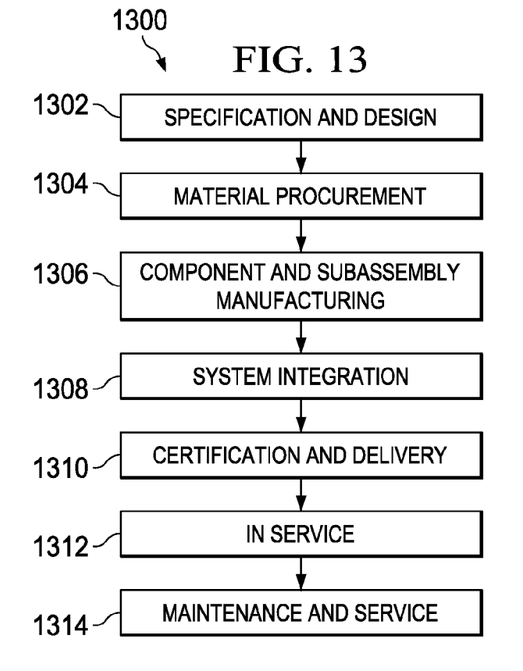
FIG. 13 is an illustration of an aircraft manufacturing and service method in the form of a block diagram in accordance with an illustrative embodiment.
Figure 14:
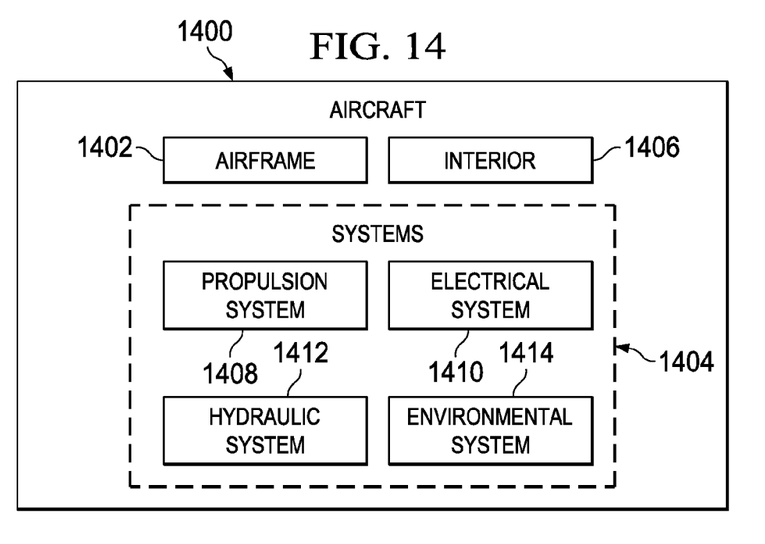
FIG. 14 is an illustration of an aircraft in the form of a block diagram in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Different parts in the different systems in aircraft 1400 may be assembled using an illustrative embodiment. The assembly of these parts may result in one or more gaps that result from manufacturing variances. These variances may be variances in dimensions of one or more of the parts for aircraft 1400.

For example, without limitation, aircraft 1400 may include a first part and a second part assembled adjacent to each other. The second part includes a portion configured to be adjacent to the first part upon attachment thereto. The second part is at least partially separated from said first part by a gap due to variances in fabrication. A shim is disposed in the gap between the first part and the second part. The shim comprises a magnetically permeable material disposed therein, and the shim material is solidified in place in the gap between the first part and said second part from exposing the magnetically permeable material to a magnetic field.

In some illustrative examples, the first part and the second part may be selected from different types of parts. For example, the first part and the second part may each be selected from one of a composite part, a metal part, a honeycomb sandwich panel, a skin panel, a plastic part, a wood part, a ceramic part, or other suitable types of parts.

In particular, the first part and the second part may be made of the same or different types of materials. For example, the first part may be a composite part while the second part is a metal part. Of course, any combination of materials for parts may be used with the shim in accordance with an illustrative embodiment.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312 and/or during maintenance and service 1314 in FIG. 13. The use of a number of the different illustrative embodiments may substantially expedite the assembly of and/or reduce the cost of aircraft 1400.

For example, an illustrative embodiment may be implemented during component and subassembly manufacturing 1306. For example, an illustrative embodiment may be implemented to form shims in wing assemblies. An illustrative embodiment also may be implemented during maintenance and service 1314. For example, composite structures manufactured during maintenance and service 1314 for replacement of deposit structures, upgrading composite structures, refurbishing composite structures, or other purposes may include shims formed in accordance with an illustrative embodiment.

In this manner, the manufacturing, maintenance, and other operations during the life cycle of aircraft 1400 may be performed more quickly with an illustrative embodiment. As a result, the cost, of manufacturing and maintaining aircraft 1400 may be reduced.

Thus, the illustrative examples provide a method and apparatus for forming a shim. In the illustrative examples, a liquid shim material is applied to a location in which the fit between parts is not as great as desired. In particular, a gap may be present between several parts. Inductive heating is used to heat the liquid shim material to form the shim for the parts.

With the use of magnetically permeable materials, these materials may be placed in locations relative to the liquid shim material to provide a desired level of heating throughout the liquid shim material to form a shim. As described above, the magnetically permeable materials may be located within the liquid shim material or external to the liquid shim material.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a shim, the method comprising:
applying a liquid shim material with a magnetically permeable material in a location for the shim between a plurality of composite parts, wherein the magnetically permeable material has a shape selected from at least one of a wire, a strip, a plate, or a sheet;
applying a magnetic field to the magnetically permeable material in the location, wherein the magnetic field is configured to heat the liquid shim material to a temperature to cause the liquid shim material to become solid and form the shim; and
removing the magnetically permeable material after heating the liquid shim material to form the shim.

2. The method of claim 1 further comprising:
positioning a magnetic field generator such that the magnetic field generator applies the magnetic field to the magnetically permeable material.

3. The method of claim 1, wherein applying the liquid shim material with the magnetically permeable material in the location for the shim between the plurality of composite parts comprises:
applying the liquid shim material to the location; and
placing the magnetically permeable material in the location.

4. The method of claim 3, wherein the magnetically permeable material is placed in at least one of in the liquid shim material in the location prior to the liquid shim material being applied to the location or on the liquid shim material after the liquid shim material is applied to the location.

5. The method of claim 1, wherein the wire has a diameter from about 0.003 inches to about 0.020 inches.

6. The method of claim 2, wherein the magnetic field generator and the magnetically permeable material form a layer placed in contact with the liquid shim material.

7. The method of claim 6, wherein the layer is configured to be removed after the liquid shim material becomes solid to form the shim.

8. The method of claim 1, wherein the magnetically permeable material is a smart susceptor.

9. The method of claim 1, wherein the magnetically permeable material is selected from at least one of an alloy, a cobalt, an iron alloy, a nickel and iron alloy, an iron and silicon alloy, an amorphous magnetic alloy, or a crystalline magnetic alloy.

10. A method for forming a shim, the method comprising:
applying a liquid shim material with a magnetically permeable material in a location for the shim between a plurality of parts, wherein the magnetically permeable material has a shape selected from at least one of a wire, a strip, a plate, or a sheet;
applying a magnetic field to the magnetically permeable material in the location, wherein the magnetic field is configured to heat the liquid shim material to a temperature to cause the liquid shim material to become solid and form the shim; and
removing the magnetically permeable material after heating the liquid shim material to form the shim.

11. An apparatus comprising:
a liquid shim material with a magnetically permeable material applied in a location for a shim between a plurality of composite parts, wherein the magnetically permeable material has a shape selected from at least one of a wire, a strip, a plate, or a sheet, and wherein the magnetically permeable material is removable after heating the liquid shim material to form the shim; and
a magnetic field generator configured to apply a magnetic field to the magnetically permeable material in the location, wherein the magnetic field is configured to heat the liquid shim material to a temperature to cause the liquid shim material to become solid and form the shim.

12. The apparatus of claim 11, wherein the magnetic field generator is positioned such that the magnetic field generator applies the magnetic field to the magnetically permeable material.

13. The apparatus of claim 11, wherein the magnetically permeable material is placed in at least one of in the liquid shim material in the location prior to the liquid shim material being applied to the location or on the liquid shim material after the liquid shim material is applied to the location.

14. The apparatus of claim 11, wherein the wire has a diameter from about 0.003 inches to about 0.020 inches.

15. The apparatus of claim 11, wherein the magnetic field generator and the magnetically permeable material form a layer.

16. The apparatus of claim 15, wherein the layer is configured to be removed after the liquid shim material becomes solid to form the shim.

17. An aircraft comprising:
a first part;
a second part includes a portion configured to be adjacent to the first part upon attachment thereto, wherein the second part is at least partially separated from the first part by a gap due to variances in fabrication; and
a shim disposed in the gap between the first part and the second part, wherein the shim comprises a magnetically permeable material disposed therein, wherein the magnetically permeable material has a shape selected from at least one of a wire, a strip, a plate, or a sheet, and the shim is solidified in place in the gap between the first part and the second part from exposing the magnetically permeable material to a magnetic field and removing the magnetically permeable material after heating the liquid shim material to form the shim.

* * * * *